United States Patent
Filburn et al.

(10) Patent No.: US 6,610,122 B1
(45) Date of Patent: Aug. 26, 2003

(54) WATER RECUPERATION FOR A CARBON DIOXIDE ($CO_2$) REMOVAL SYSTEM

(75) Inventors: Thomas Filburn, Granby, CT (US); Karen Murdoch, Broad Brook, CT (US)

(73) Assignee: Hamilton Sundstrand Corp., Windsor Locks, CT (US)

( * ) Notice: Subject to any disclaimer, the term of this patent is extended or adjusted under 35 U.S.C. 154(b) by 0 days.

(21) Appl. No.: 10/134,945

(22) Filed: Apr. 30, 2002

(51) Int. Cl.[7] .......................... B01D 53/04; B01D 53/22
(52) U.S. Cl. ..................... 95/52; 95/139; 96/4; 96/108; 96/136
(58) Field of Search .................. 95/45, 51, 52, 95/117, 118, 139; 96/4, 14, 108, 130, 134, 136, 142

(56) References Cited

U.S. PATENT DOCUMENTS

| | | | | |
|---|---|---|---|---|
| 3,221,477 A | * | 12/1965 | Arnoldi et al. | 95/26 |
| 3,242,651 A | * | 3/1966 | Arnoldi | 96/127 |
| 3,263,400 A | * | 8/1966 | Hoke et al. | 95/117 |
| 3,369,343 A | * | 2/1968 | Robb | 95/46 |
| 3,727,375 A | * | 4/1973 | Wallace | 95/68 |
| 3,735,558 A | * | 5/1973 | Skarstrom et al. | 95/51 |
| 4,048,993 A | * | 9/1977 | Dobritz | 128/201.13 |
| 4,461,155 A | * | 7/1984 | Werjefelt | 62/93 |
| 4,786,294 A | * | 11/1988 | Jonqueres et al. | 95/115 |
| 4,909,810 A | * | 3/1990 | Nakao et al. | 95/52 |
| 4,934,148 A | * | 6/1990 | Prasad et al. | 62/655 |
| 4,964,886 A | * | 10/1990 | Brugerolle et al. | 95/51 |
| 5,005,787 A | * | 4/1991 | Cullingford | 244/163 |
| 5,061,455 A | * | 10/1991 | Brose et al. | 96/122 |
| 5,082,471 A | * | 1/1992 | Athayde et al. | 95/51 |
| 5,281,254 A | * | 1/1994 | Birbara et al. | 95/44 |
| 5,332,424 A | * | 7/1994 | Rao et al. | 95/47 |
| 5,451,248 A | * | 9/1995 | Sadkowski et al. | 95/99 |
| 5,531,220 A | * | 7/1996 | Cassidy | 128/204.29 |
| 5,620,500 A | * | 4/1997 | Fukui et al. | 95/52 |
| 5,843,209 A | * | 12/1998 | Ray et al. | 95/52 |
| 5,876,486 A | * | 3/1999 | Steinwandel et al. | 95/44 |
| 6,007,603 A | * | 12/1999 | Garrett | 95/12 |
| 6,027,546 A | * | 2/2000 | Kusters et al. | 95/52 |
| 6,087,029 A | * | 7/2000 | Golovin et al. | 429/27 |
| 6,238,460 B1 | * | 5/2001 | Deng et al. | 95/98 |
| 6,413,298 B1 | * | 7/2002 | Wnek et al. | 95/52 |
| 6,471,749 B1 | * | 10/2002 | Kawai et al. | 95/99 |

* cited by examiner

*Primary Examiner*—Robert H. Spitzer
(74) *Attorney, Agent, or Firm*—William W. Jones

(57) ABSTRACT

Water vapor is removed from a mixture of air, metabolic carbon dioxide ($CO_2$), and water vapor prior to removing the $CO_2$ from the mixture. The water vapor-containing mixture is passed through a membrane module which is operative to separate the water vapor from the air and $CO_2$ mixture. The water vapor in the entering mixture will pass in one direction through the membrane in the module from an entry side of the membrane to an exit side of the membrane. The membrane divides the module into two chambers, one of which receives the water vapor-containing mixture, and the other of which receives $CO_2$-free air from a $CO_2$ adsorbant station. The water vapor-containing mixture is removed from a closed habitable environment such as a space station, a space suit, a submarine, or the like, and is moved through the membrane module where the water vapor is removed from the gas stream. The water vapor-free gas stream then flows through the $CO_2$ adsorption station where the $CO_2$ and any remaining water vapor are separated from the air in the mixture. The $CO_2$-free air then flows back through the membrane module via the membrane module exit chamber where the air is rehumidified with the water vapor that has passed through the membrane. The rehumidified air stream is then returned to the dosed habitable environment where it can be used for breathing purposes.

7 Claims, 1 Drawing Sheet

WATER RECUPERATION FOR A CARBON DIOXIDE ($CO_2$) REMOVAL SYSTEM

TECHNICAL FIELD

Figure 1:
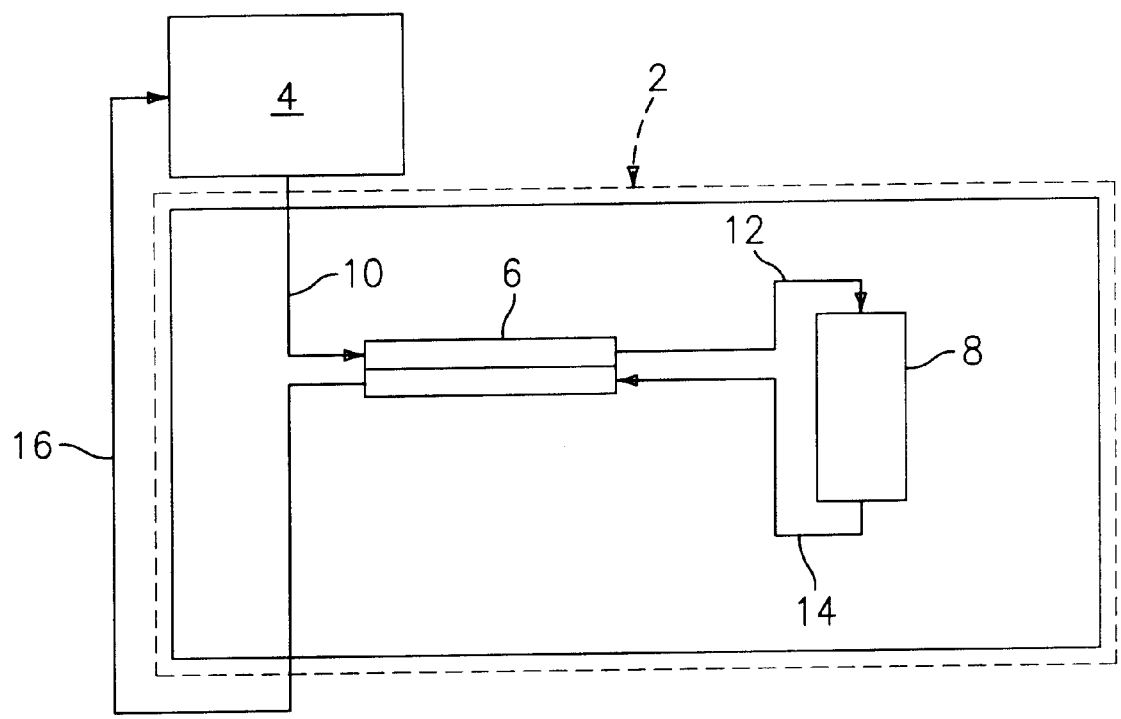

The present invention relates to a method and system for dehumidifying a gas stream consisting of a mixture of air, metabolic carbon dioxide and water vapor; removing the carbon dioxide from the dehumidified gas stream; and then re-humidifying the $CO_2$-free air stream. More particularly, this invention relates to a method and system for reconditioning the atmosphere in a closed habitable environment in a relatively passive manner.

BACKGROUND OF THE INVENTION

The breathing air of a closed inhabited spacecraft quickly reaches unacceptable levels of humidity and carbon dioxide unless controlled. Current technology utilizes combinations of regenerable adsorbent beds to remove both $CO_2$ and water. Typically, two or more beds are operated in a cyclic mode wherein one bed is adsorbing while the other bed is desorbing. Desorption is achieved by heating and/or pulling a vacuum on the bed. Both molecular sieves and solid amine adsorbents will adsorb both $CO_2$ and water. If the carbon dioxide is to be dumped to a vacuum, then the water adsorbed with it will be lost. The atmosphere in the space craft then tends to get overly dehydrated to the point that it is uncomfortable for the crew members. Furthermore, as manned space missions become longer, the need to recover water and achieve closed loop water balance becomes more critical. Thus, one problem relating to space missions deals with the need to humidify the atmosphere in the space craft.

There are several methods of recovering the water from the closed habitable craft atmosphere before the water is lost. One method is to adsorb the water first on a desiccant prior to its introduction to the $CO_2$ adsorbent. Desiccants, such as molecular sieves or silica gel, require high energy for desorption. Another method is to condense the water. This requires heat removal and places a high load on a cooling system to affect the phase change. Additionally, in a weightless environment, the air stream with the condensed water must be processed by a separator adding complexity to the entire system.

It would be desirable to provide a simplified essentially passive dehumidifying and re-humidifying system and method for treating the breathable atmosphere in a closed habitat of the type described above.

DISCLOSURE OF THE INVENTION

Our solution to the problem of dosed habitat breathable atmosphere humidity control is to remove and then replace water vapor in a habitat atmosphere exhaust stream bled from the habitat. Water vapor removal is accomplished by means of a membrane which will selectively extract water vapor from the habitat exhaust gas stream so as to convert the habitat exhaust gas stream to an essentially dry gas stream which contains oxygen and $CO_2$. The water vapor removal step is performed prior to the habitat exhaust stream's entering the $CO_2$ adsorbent bed. Any remaining water vapor in the gas stream is absorbed by the adsorbent bed. The water vapor passes through the membrane. The membrane is contained in a membrane module or housing and the membrane divides the housing into two chambers, wherein the chamber that receives the exhaust from the adsorbent bed has a lower water vapor partial pressure than the other chamber.

The air-water vapor-$CO_2$ mixture is drawn from the habitat and passes into one of the chambers in the membrane housing. As the mixture flows through the first chamber, water vapor is removed from the mixture by the membrane and the water vapor passes through the membrane into the second chamber. As the air stream moves through the first chamber in the membrane housing, the water vapor content of the stream decreases to a minimal amount. The resultant mixture of air and $CO_2$ and a small amount of water vapor in the first chamber then flows to a $CO_2$ adsorption station where the $CO_2$ and the remaining water vapor are removed from the mixture. The adsorption station can take the form of a $CO_2$ adsorption bed or some other form of conventional $CO_2$ scrubber material. After the $CO_2$ and the remaining water vapor are removed from the gas stream, the resultant air stream is drawn through the second chamber where it will become rehydrated by the water vapor that has passed through the membrane and into the second chamber. As the returning air stream flows through the second chamber, counter current to the direction of flow through the first chamber, the water vapor content of the stream increases. The return air stream always contains less water than the inlet air stream, thus providing the driving force for water vapor to permeate through the membrane. The rehydrated air stream is then returned to the habitat for breathing purposes.

The system of this invention is relatively passive in that significant energy input is not necessary to enable operation of the system. The small amount of water vapor removed in the $CO_2$ adsorbent bed is needed to create the driving force for the membrane to operate as intended. The larger the area of the membrane, the smaller the amount of water vapor absorbed by the $CO_2$ adsorbent bed must be. For complete water vapor recovery, it is possible to include a small regenerable desiccant bed prior to the $CO_2$ adsorbent bed.

It is therefore an object of this invention to provide a method and system for conserving the water vapor content, while removing the $CO_2$ content, of an environmental gas mixture stream which is extracted from a closed habitable environment, such as a space craft, space suit, submarine, space station, or the like.

It is an additional object of this invention to provide a method and system of the character described wherein the water vapor content of the breathable atmosphere is removed from an air-$CO_2$-water vapor gas mixture that is extracted from the habitable environment.

It is a further object of this invention to provide a method and system of the character described wherein the water vapor content is removed from the gas mixture by means of a membrane which selectively passes water vapor in the gas mixture from one side of the membrane to an opposite side of the membrane.

It is another object of this invention to provide a method and system of the character described wherein the dehydrated air-$CO_2$ mixture has the $CO_2$ and a small amount of water vapor content thereof stripped from the air content, and the $CO_2$-free air is then rehydrated by water vapor that was removed by the air-$CO_2$-water vapor gas mixture by the membrane.

DETAILED DESCRIPTION OF THE DRAWINGS

Figure 2:
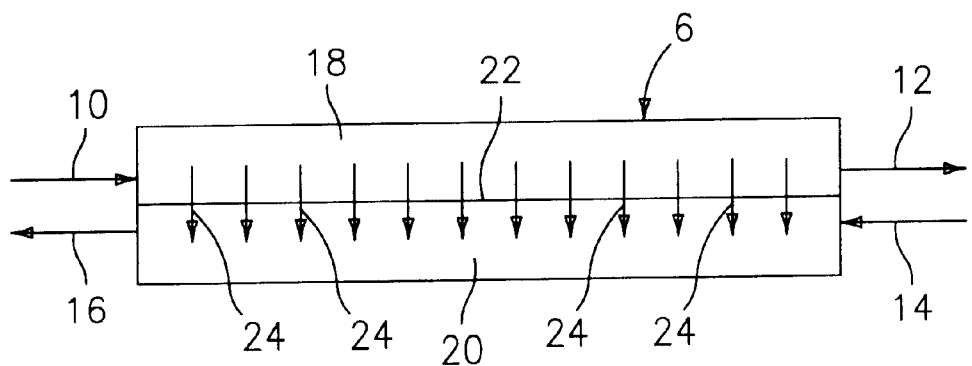

These and other objects of the invention will become more readily apparent from the following detailed description thereof when taken in conjunction with the accompanying drawings in which:

FIG. 1 is a schematic view of a $CO_2$ removal and air stream dehydration/rehydration system of this invention; and FIG. 2 is a schematic view of a gas stream dehydration/rehydration membrane module formed in accordance with this invention.

SPECIFIC MODE FOR CARRYING OUT THE INVENTION

Referring now to the drawings, FIG. 1 is a schematic view of a system formed in accordance with this invention, which system is designated generally by the numeral 2 and is a component of a closed habitat 4 such as a space suit, space station, submarine or the like. The system 2 includes a membrane module or housing 6 and a $CO_2$ adsorption station 8.

A first line 10 connects the habitat 4 with one side of the membrane housing 6 and a second line 12 connects that one side of the membrane housing 6 with the $CO_2$ adsorption station 8. A third line 14 connects the $CO_2$ adsorption station 8 with a second side of the membrane housing 6. A fourth line 16 connects the second side of the membrane housing 6 with the habitat 4.

Referring now to FIG. 2, details of the membrane housing 6 are shown. The housing 6 is divided into opposite chambers 18 and 20 by the membrane 22. The membrane 22 selectively removes and transports water vapor from the first chamber 18 to the second chamber 20, as indicated by arrows 24. Suitable membranes include: "NAFION" which is an ion exchange membrane sold by DuPont which is a membrane of the general class known as electro-osmotic membranes; polymer electrolyte membranes; proton exchange membranes; and sulfonated perfluorinated polymer membranes. As noted above, the air-$CO_2$-water vapor mixture flows from the habitat 4 through the line 10 and into the first chamber 18.

The membrane 22 selectively removes the water vapor component from the mixture and transports the water vapor to the second chamber 20 as indicated by arrows 24. The force that drives the water vapor through the membrane 22 is the differential in the water vapor partial pressure between the two chambers 18 and 20 which is initially created by the small amount of water vapor that is removed from the gas stream by the $CO_2$ adsorbing station 8. The water vapor partial pressure in the chamber 20 is less than the water vapor partial pressure in the chamber 18, thus the migration of water vapor through the membrane 22.

The water vapor partial pressure differential is created by employing a $CO_2$ adsorbent that will also absorb a small amount, i.e., about 10%, of the water vapor from the gas stream as it passes through the adsorbent bed 8. Thus, once the system is up and running, about 90% of the water vapor in the gas stream passes through the membrane 22, and essentially the rest of the water vapor in the gas stream is absorbed by the adsorbent bed 8. The magnitude of the partial pressure differential determines the area of the membrane 22 which will be needed to dehumidify and rehumidify the gas mixture flowing through the lines 12 and 14. The air-$CO_2$ mixture thus becomes dehydrated by reason of passing through the first chamber 18. The dehydrated mixture then flows through line 12 to the $CO_2$ adsorbent bed 8 where the $CO_2$ and remaining water vapor are removed from the mixture. The resultant air stream is then passed through a line 14 and into the second chamber 20 where the air stream will be rehydrated by the water vapor in the second chamber 20 before the air stream enters the line 16 which leads back to the habitat 4. The recycling of the breathable atmosphere from the habitat 4 through the adsorbent bed 8 and the adjunct chambers 18 and 20 is performed at a rate which provides the habitat with a humidified low $CO_2$ content breathable atmosphere continually. The water vapor is passed through the membrane 22 due to the higher water vapor partial pressure of about 0.15 psi on the side 18 of the membrane 22 and a lower water vapor partial pressure of about 0.12 psi on the side 20 of the membrane 22. The amount of water vapor transferred from the inlet stream 10 to the return stream can easily be as high as 90%.

It will be readily appreciated that this invention can provide $CO_2$ removal from the breathable atmosphere in a closed habitable environment without incurring a significant loss of moisture from the breathable atmosphere. The system and method of this invention are relatively passive in that they do not require a significant power input to function.

Since many changes and variations of the disclosed embodiment of the invention may be made without departing from the inventive concept, it is not intended to limit the invention otherwise than as required by the appended claims.

What is claimed is:

1. A method for reconditioning a breathable atmosphere contained in a dosed habitable environment, said method comprising:
    a) the step of removing a portion of the atmosphere from said habitable environment to form a stream of air from said habitable environment;
    b) the step of dehumidifying the stream of air by passing water vapor from said stream of air through a water vapor-permeable membrane;
    c) the step of removing metabolic carbon dioxide ($CO_2$) from the dehumidified stream of air to form an essentially $CO_2$-free air stream;
    d) the step of re-humidifying the essentially $CO_2$-free air stream with water vapor which has passed through said membrane; and
    e) the step of returning the rehumidified air stream to said habitable environment.

2. The method of claim 1 wherein said membrane is a membrane selected from the group consisting of electro-osmotic membranes and sulfonated perfluorinated polymer membranes.

3. The method of claim 1 wherein the water vapor is passed through said membrane by creating a higher water vapor partial pressure of about 0.15 psi on one side of said membrane and a lower water vapor partial pressure of about 0.12 psi on an opposite side of said membrane.

4. The method of claim 1 further Comprising the step of removing residual water vapor from the air stream during the $CO_2$ removing step.

5. An assembly for reconditioning a breathable atmosphere stream which atmosphere stream is derived from a closed habitable environment, said assembly comprising:
    a) a membrane module having first and second chambers which are separated from each other by a membrane, said membrane being operative to transport water vapor from said first chamber to said second chamber thereby dehumidifying said atmosphere stream;
    b) a first line which is operative to transfer said atmosphere stream from said habitable environment to said first chamber in said membrane module;
    c) a carbon dioxide ($CO_2$) adsorption station for removing $CO_2$ from said atmosphere stream;
    d) a second line which is operative to transfer said atmosphere stream from said first chamber to said adsorption station;
    e) a third line which is operative to transfer said atmosphere stream from said adsorption station to said second chamber wherein said atmosphere stream will be rehumidified with water vapor which has passed through said membrane; and f) a fourth line which is operative to transfer said atmosphere stream from said second chamber to said habitable environment.

6. The assembly of claim 5 wherein said membrane is a membrane selected from the group consisting of electro-osmotic membranes, polymer electroyte membranes, proton exchange membranes, and sulfonated perfluorinated polymer membranes.

7. The assembly of claim 5 wherein said $CO_2$ adsorption station is operable to absorb water vapor from the atmosphere stream.

* * * * *

UNITED STATES PATENT AND TRADEMARK OFFICE
CERTIFICATE OF CORRECTION

PATENT NO. : 6,610,122 B1
DATED : August 26, 2003
INVENTOR(S) : Thomas Filburn et al.

It is certified that error appears in the above-identified patent and that said Letters Patent is hereby corrected as shown below:

<u>Title page,</u>
Item [57], ABSTRACT,
Line 23, "dosed" should be -- closed --

<u>Column 1,</u>
Line 51, "dosed" should be -- closed --

<u>Column 4,</u>
Line 22, "dosed" should be -- closed --

Signed and Sealed this

Eighteenth Day of November, 2003

JAMES E. ROGAN
*Director of the United States Patent and Trademark Office*